United States Patent [19]

Macosko et al.

[11] Patent Number: 4,473,531
[45] Date of Patent: Sep. 25, 1984

[54] RIM MIXHEAD WITH HIGH PRESSURE RECYCLE

[75] Inventors: Christopher W. Macosko, Minneapolis; Donald B. McIntyre, St. Paul, both of Minn.

[73] Assignee: Regents of the University of Minnesota, Minneapolis, Minn.

[21] Appl. No.: 258,280

[22] Filed: Apr. 28, 1981

[51] Int. Cl.³ .................... B01F 5/04; B01F 15/02; B01J 14/00
[52] U.S. Cl. .................... 422/133; 137/625.48; 366/159
[58] Field of Search ............. 422/133; 366/136, 137, 366/159; 137/625.4, 625.48; 425/4 R

[56] References Cited

U.S. PATENT DOCUMENTS

| | | | |
|---|---|---|---|
| 3,706,515 | 12/1972 | Keuerleber et al. | 425/4 R |
| 3,960,506 | 6/1976 | Schmitzer | 137/625.4 |
| 4,082,512 | 4/1978 | Wingard et al. | 23/313 R |
| 4,099,919 | 7/1978 | Leidal | 422/133 |
| 4,108,606 | 8/1978 | Wingard | 422/119 |
| 4,126,399 | 11/1978 | Schneider et al. | 366/159 |
| 4,189,070 | 2/1980 | Macosko et al. | 222/134 |
| 4,291,991 | 9/1981 | Schulte et al. | 366/159 |
| 4,344,919 | 8/1982 | Kelterbaum | 422/133 |

Primary Examiner—Michael S. Marcus
Attorney, Agent, or Firm—Burd, Bartz & Gutenkauf

[57] ABSTRACT

A mixhead for a reaction injection molding machine utilizing at least two liquid components supplied under pressure from a delivery system including a recirculation line. The mixhead comprises a housing having a longitudinal channel through the housing and a ram fit with a close slide fit in the channel. The ram is reciprocable from a first upstream position to a second downstream position. A first inlet port extends through the housing into the channel. A first exit port extends from the channel through the housing upstream from the inlet port and on the opposite side of the channel. At least one other similar inlet and outlet port is provided, each spaced peripherally around the channel from the first inlet and outlet ports. Spaced apart recirculation passages extend through the ram to connect the respective inlet and outlet ports when the ram is in its second downstream position.

10 Claims, 5 Drawing Figures 4,473,531

RIM MIXHEAD WITH HIGH PRESSURE RECYCLE

FIELD OF THE INVENTION

BACKGROUND OF THE INVENTION

This invention is directed to a mixhead for use in a reaction injection molding (RIM) machine in which the molding resin is composed of two or more liquid components which are mixed within the mixhead and then injected into a mold where they react to a high polymer. One such machine is shown in Macosko et al U.S. Pat. No. 4,189,070, issued Feb. 19, 1980. The mixhead includes a mixing chamber with two or more inlets for the separate liquid resin components which are introduced under pressure from vessels containing the separate liquids. The mixhead operates intermittently. The mixed components are dispensed from the mixing chamber by high pressure flow of the components which is interrupted by action of a reciprocal piston or ram. Just before mixing it is desirable that the components be recirculated back to the supply vessel. More particularly, this invention is directed to a new impingement type RIM mixhead with high pressure recycle.

One of the most important problems in designing impingement mixheads for reaction injection molding is the start-up transient. This is known as "lead-lag" in the industry since one component stream leads or lags the other in entering the chamber. Another transient problem can be low initial flow rate or Reynolds number, and thus poor mixing. Because in RIM the mixhead is used intermittently and for a short period of from about 1 to 3 seconds, the transient can be a significant part of the cycle. Even a small amount of lead-lag can cause streaks and weak sections in finished parts.

THE PRIOR ART

The best way to eliminate transient effects appears to be to recycle the initial part of the component shot at high pressure. Most commercial RIM equipment uses some type of high pressure recycle. One such design is that of Keuerleber et al U.S. Pat. No. 3,706,515. That patent discloses two different embodiments. The first of these accomplishes recycling from a component inlet to an outlet on the same side of the mixhead housing through a channel formed in the outside wall of the mixhead ram, this channel being bounded on one side by the bore wall. The second embodiment has bypass channels within the body of the ram itself which extend longitudinally of the ram generally parallel and spaced inwardly from the outer wall of the ram.

Similar mixheads are disclosed in Wingard et al U.S. Pat. No. 4,082,512, Leidal U.S. Pat. No. 4,099,919 and Wingard U.S. Pat. No. 4,108,606.

The first embodiment of Keuerleber et al presents problems in sealing the liquid components from one another to prevent admixing. In both Keuerleber et al embodiments, the fluid paths change direction. This leads to greater pressure drop than is desired and can cause excessive wear on the ram. The mixhead of the present invention is directed toward alleviating these problems.

SUMMARY OF THE INVENTION

The present invention is directed to a mixhead for a reaction injection molding machine utilizing at least two liquid components supplied under pressure from a delivery system including a recirculation line. The mixhead comprises a housing having a longitudinal channel through the housing and a ram disposed with a close slide fit in the channel. The ram is reciprocable in the channel from a first open or upstream position to a second closed or downstream position. When the ram is in its first open position, the portion of the channel downstream from the ram functions as a mixing chamber for the reactive resin components.

A first inlet port extends through the housing into the channel. A first exit port extends from the channel through the housing upstream from the first inlet port and on the opposite side of the channel. Dependent upon the number of components, at least one other inlet port is provided through the housing into the channel. At least one other exit port is provided from the channel through the housing located upstream from the corresponding inlet port and on the opposite side of the channel. A first recirculation passage extends through the ram connecting the first inlet and first exit ports when the ram is in its second downstream position and at least one other recirculation passage extends through the ram spaced from the first recirculation passage and connecting the other inlet and outlet ports when the ram is in its second downstream position.

BRIEF DESCRIPTION OF THE DRAWINGS

The invention is illustrated by the accompanying drawings in which corresponding parts are identified by the same numerals and in which.

DETAILED DESCRIPTION OF THE PREFERRED EMBODIMENT

Figure 1:
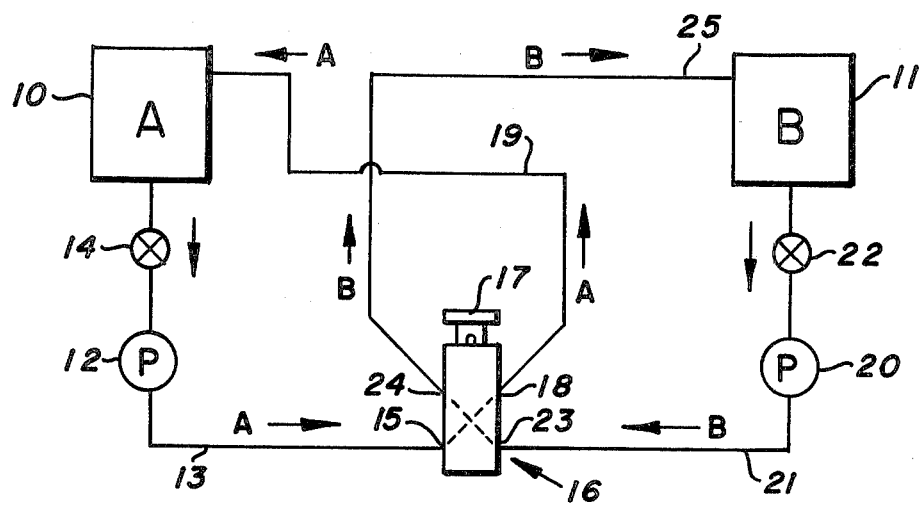
FIG. 1 is a schematic representation of a reaction injection molding system incorporating the mixhead of the present invention.

Referring now to the drawings, and particularly to FIG. 1, the reaction injection molding system schematically shown comprises two supply vessels 10 and 11 for containing the reactant liquids A and B, respectively. Dependent upon the particular reactants, the supply vessels may be fitted with heating elements, stirrers, and the like, and preferably with means for connection to a source of nitrogen or other inert gas under pressure. Reactant A is circulated by pump 12 through flow line 13 including valve 14 to inlet 15 of mixhead 16. When the mixhead ram 17 is in the downstream position as shown, liquid component A circulates through the mixhead, as described in greater detail hereinafter, and exits through port 18 through flow line 19 back to vessel 10. Simultaneously component B is circulated by pump 20 through flow line 21 including valve 22 to inlet port 23 in mixhead 16. Component B circulates through the mixhead out through exit port 24 and flow line 25 to return to vessel 11.

Figures 2, 3, 4:
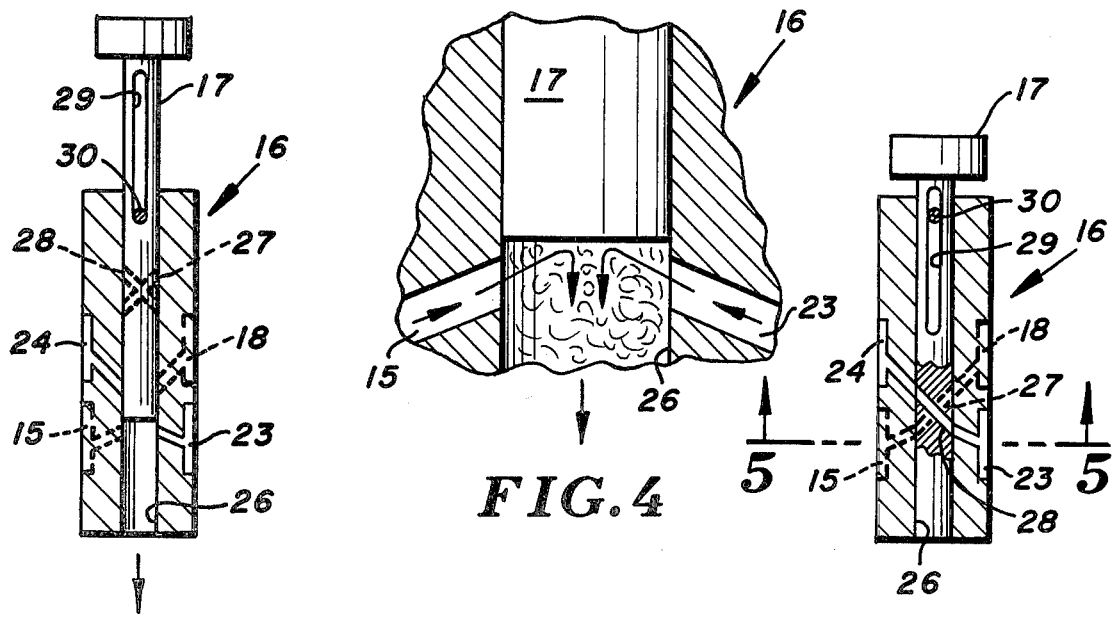
FIG. 2 is a longitudinal section through the mixhead showing the ram in its open or upstream mix position.
FIG. 3 is a similar longitudinal section showing the ram in its closed or downstream ejection and recirculation position.
FIG. 4 is a fragmentary section on an enlarged scale illustrating schematically impingement mixing of the components.

Details of mixhead 16 are shown in FIGS. 2 through 5. The mixhead body includes a longitudinal channel 26 in which ram 17 is disposed with a close slide fit for reciprocation between a first open or upstream position shown in FIG. 2 and a second closed or downstream position shown in FIG. 3. When the ram is in its first position, that portion of channel 26 downstream from the ram functions as an impingement mixing chamber, as best shown in FIG. 4, the jets of components impinging upon the end of ram 17. The downstream end of channel 26 functions as a discharge passage. Of necessity, channel 26 is of uniform cross-section over its entire length. As shown in FIG. 3, ram 17 traverses the entire length of the channel with its downstream end extending at least flush with the end of the mixhead.

Component inlet ports 15 and 23 enter the housing and intersect channel 26 preferably at an acute angle between about 45° and 60° relative to the longitudinal axis of the mixhead so as to cause the liquid components to impinge upon the downstream face of ram 17. Exit ports 18 and 24 preferably are disposed at angles between about 135° to 120° and are spaced upstream from the inlet ports so as to be in general alignment with the inlet ports, as shown in FIG. 1. Straight line alignment is not essential but it is desirable that changes in direction of the fluid flow paths be minimized.

A recycle flow passage 27 extends through ram 17 so as to connect inlet port 15 and exit port 18 when the ram is in its downstream position shown in FIG. 3 to recycle component A. A further recycle passage 28 extends through ram 17 to connect inlet port 23 and exit port 24 when the ram is in its downstream position to recycle component B.

Figure 5:
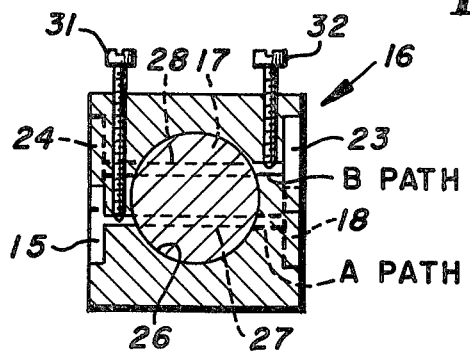
FIG. 5 is a transverse section generally on the line 5—5 of FIG. 3 and in the direction of the arrows.

As best shown in FIG. 5, the flow path formed by inlet port 15, recycle passage 27 and exit port 18 preferably lie in one plane and the flow path formed by inlet 23, recycle passage 28 and exit port 24 lie in another parallel plane. As shown, these planes are spaced apart on opposite sides of the longitudinal axis of the ram so as to prevent any intersection of the flow paths and mixing of the components during recirculation. This displacement of inlet ports 15 and 23 creates a swirl effect. When low pressure exists, as in a closed mold, this gives the same mixing performance for slightly lower pressure drop as compared to direct impingement of the component streams in the mixing chamber. Although for convenience the flow paths are shown and described as lying in parallel planes, this obviously is not mandatory, so long as the flow paths do not intersect. The swirl effect can be reduced by altering the alignment of the inlet ports.

It is imperative that the ram 17 be kept in alignment so as to mate recycle passages 27 and 28 with the respective inlet and exit ports. One manner in which ram 17 may be prevented from rotating is to provide a longitudinal slot 29 in the ram which functions as a keyway for a transverse pin 30 supported in the body on opposite sides of the channel. Alternatively, the cross section of the ram 17 and channel 26 may be some geometrical configuration other than circular.

It is desirable that the nozzle openings from the inlet ports 15 and 23 be adjustable to help balance the momentum of each liquid component stream. This may be accomplished by screws 31 and 32 extending into ports 15 and 23, respectively, as shown in FIG. 5. Variation of the nozzles may also be accomplished by use of orifice inserts with different diameter openings.

Preferably the flow of components should be continuous. This is not possible because of the valving effect of the ram. The interruption of flow is during the period in which the ram is moved between the positions shown in FIGS. 2 and 3. During this short time neither injection of components from the inlet ports nor recirculation is occuring. This dead travel time is preferably minimized by locating the recycle flow passages 27 and 28 close to the downstream end of the ram.

Use of the improved mixhead as described and illustrated greatly facilitates high pressure recycle of the liquid reaction components. The recycle stream need not change direction when going across the ram. This eliminates the undesirable pressure drop and wear on the ram encountered in the Keuerleber et al mixhead. There is less possibility of components A and B mixing during recycle. The recycle path across the ram is shorter and the short circuit path between the two streams is longer.

Although the RIM system and mixhead are described in terms of the use of two reactive liquid components, it will be readily understood that the system and mixhead design are adaptable to the use of three or more components. Additional inlet ports, exit ports and recycle passages are provided as necessary, along with additional supply vessels, flow lines, etc. Preferably the respective inlet and exit ports are spaced approximately equally around the periphery of the mixhead channel, although if desired the inlet ports may be on one side of the channel and the exit ports on the other, both spaced apart to avoid intersection, as described.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A mixhead for a reaction injection molding machine utilizing at least two liquid components supplied under pressure from a delivery system including a recirculation line, said mixhead comprising:
   (A) a housing,
   (B) a longitudinal channel through said housing, said channel being of uniform circular cross section over its entire length, the downstream end of the channel functioning as a discharge passage,
   (C) a ram disposed with a close slide fit in said channel and reciprocable in said channel to traverse the entire length of the channel from a first upstream position to a second downstream position, the downstream end of the ram in its downstream position extending at least flush with the end of the channel, the portion of said channel downstream from the ram when in its upstream position comprising a mixing chamber,
   (D) a first inlet port through the housing into the mixing chamber portion of said channel,
   (E) a first exit port from said channel through the housing, said first exit port located upstream from the first inlet port and generally on the opposite side of the channel from the first inlet port,
   (F) at least one other inlet port through the housing into the mixing chamber portion of said channel and spaced from the first inlet port, the longitudinal axes of both of said inlet ports lying in planes spaced from the longitudinal axis of said channel and ram, whereby a swirl motion is imparted to incoming jets of liquid components, (G) at least one other exit port from said channel through the housing, said other exit port located upstream from the corresponding inlet port and on the generally opposite side of the channel from said corresponding inlet port, (H) a first recirculation passage through said ram connecting said first inlet and exit ports when the ram is in its second position, and (I) at least one other recirculation passage through said ram and spaced from the first recirculation passage, said other passage connecting said other inlet and exit ports when the ram is in its second position.

2. A mixhead according to claim 1 wherein means are provided to prevent rotation of the ram in said channel.

3. A mixhead for a reaction injection molding machine utilizing at least two liquid components supplied under pressure from a delivery system including a recirculation line, said mixhead comprising:

(A) a housing, (B) a longitudinal channel through said housing, the downstream end of the channel functioning as a discharge passage, (C) a ram disposed with a close slide fit in said channel and reciprocable in said channel from a first upstream position to a second downstream position, the portion of said channel downstream from the ram when in its upstream position forming an impingement mixing chamber, (D) a first inlet port through the housing into the mixing chamber portion of said channel, (E) a first exit port from said channel through the housing, said first exit port located upstream from the first inlet port and generally on the opposite side of the channel from the first inlet port, (F) at least one other inlet port through the housing into the mixing chamber portion of said channel and spaced from the first inlet port, both of said inlet ports entering said channel closely adjacent to the downstream end of said ram when the ram is in the upstream position and at angles directed toward said ram, whereby incoming jets of liquid components impinge upon said ram end, (G) at least one other exit port from said channel through the housing, said other exit port located upstream from the corresponding inlet port and on the generally opposite side of the channel from said corresponding inlet port, (H) a first recirculation passage through said ram connecting said first inlet and exit ports when the ram is in its second position, and (I) at least one other recirculation passage through said ram and spaced from the first recirculation passage, said other passage connecting said other inlet and exit ports when the ram is in its second position.

4. A mixhead according to claim 3 wherein said channel is of circular cross-section and the longitudinal axes of said inlet ports lie spaced from the longitudinal axis of said channel and ram, whereby a swirl motion is imparted to incoming jets of liquid components.

5. A mixhead according to claim 3 wherein said respective inlet ports, recirculation passages and exit ports are in general longitudinal alignment, each with the other.

6. A mixhead according to claim 3 wherein said inlet ports are directed upstream and disposed at angles between about 45° and 60° relative to the longitudinal axis of said channel and ram.

7. A mixhead for a reaction injection molding machine utilizing at least two liquid components supplied under pressure from a delivery system including a recirculation line, said mixhead comprising:

(A) a housing, (B) a longitudinal channel through said housing, the downstream end of the channel functioning as a discharge passage, (C) a ram disposed with a close slide fit in said channel and reciprocable in said channel from a first upstream position to a second downstream position, the portion of said channel downstream from the ram when in its upstream position comprising a mixing chamber, (D) a first inlet port through the housing into the mixing chamber portion of said channel, said first inlet port being directed upstream and disposed at angles between about 45° and 60° relative to the longitudinal axis of said channel and ram, (E) a first exit port from said channel through the housing, said first exit port located upstream from the first inlet port and generally on the opposite side of the channel from the first inlet port, (F) at least one other inlet port through the housing into the mixing chamber portion of said channel and spaced from the first inlet port, said other inlet port also being directed upstream and between about 45° and 60° relative to the longitudinal axis of the channel and ram, (G) at least one other exit port from said channel through the housing, said other exit port located upstream from the corresponding inlet port and on the generally opposite side of the channel from said corresponding inlet port, (H) a first recirculation passage through said ram connecting said first inlet and exit ports when the ram is in its second position, and (I) at least one other recirculation passage through said ram and spaced from the first recirculation passage, said other passage connecting said other inlet and exit ports when the ram is in its second position.

8. A mixhead according to claim 7 wherein:

(A) said inlet ports enter the channel closely adjacent to the downstream end of the ram in the upstream position, (B) said respective inlet ports, recirculation passages and exit ports are in general longitudinal alignment, each with the other, (C) said channel and ram are of circular cross-section, and (D) the longitudinal axes of said respective ports and passages lie in planes spaced from the longitudinal axis of the channel and ram.

9. A mixhead according to claim 8 wherein means are provided to prevent rotation of the ram in said channel.

10. A mixhead for a reaction injection molding machine utilizing at least two liquid components supplied under pressure from a delivery system including a recirculation line, said mixhead comprising:

(A) a housing, (B) a longitudinal channel through said housing, said channel being of uniform cross section over its entire length, the downstream end of the channel functioning as a discharge passage, (C) a ram disposed with a close slide fit in said channel and reciprocable in said channel to traverse the entire length of the channel from a first upstream position to a second downstream position, the downstream end of the ram in its downstream position extending at least flush with the end of the channel, the portion of said channel downstream from the ram when in its upstream position comprising a mixing chamber, (D) a first inlet port through the housing into the mixing chamber portion of said channel, (E) a first exit port from said channel through the housing, said first exit port located upstream from the first inlet port and generally on the opposite side of the channel from the first inlet port, (F) at least one other inlet port through the housing into the mixing chamber portion of said channel and spaced from the first inlet port, (G) at least one other exit port from said channel through the housing, said other exit port located upstream from the corresponding inlet port and on the generally opposite side of the channel from said corresponding inlet port, (H) a first recirculation passage through said ram connecting said first inlet and exit ports when the ram is in its second position, and (I) at least one other recirculation passage through said ram and spaced from the first recirculation passage, said other passage connecting said other inlet and exit ports when the ram is in its second position, said respective inlet ports, recirculation passages and exit ports being in general longitudinal alignment, each with the other.

* * * * *